US012070780B2

(12) United States Patent
Liang

(10) Patent No.: US 12,070,780 B2
(45) Date of Patent: Aug. 27, 2024

(54) MACHINE CLEANING DEVICE

(71) Applicant: CHANGXIN MEMORY TECHNOLOGIES, INC., Hefei (CN)

(72) Inventor: Xueyu Liang, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 450 days.

(21) Appl. No.: 17/442,326

(22) PCT Filed: Jun. 30, 2021

(86) PCT No.: PCT/CN2021/103379

§ 371 (c)(1),
(2) Date: Sep. 23, 2021

(87) PCT Pub. No.: WO2022/088730

PCT Pub. Date: May 5, 2022

(65) Prior Publication Data

US 2023/0056022 A1 Feb. 23, 2023

(30) Foreign Application Priority Data

Nov. 2, 2020 (CN) ......................... 202011203503.0

(51) Int. Cl.
*B08B 1/30* (2024.01)
*B08B 1/12* (2024.01)
(Continued)

(52) U.S. Cl.
CPC .................. *B08B 1/30* (2024.01); *B08B 1/12* (2024.01); *B08B 1/143* (2024.01); *B08B 3/024* (2013.01);
(Continued)

(58) Field of Classification Search
CPC .. B08B 1/30; B08B 1/12; B08B 1/143; B08B 3/024; B08B 5/04; B08B 13/00;
(Continued)

(56) References Cited

U.S. PATENT DOCUMENTS 5,431,599 A 7/1995 Genco
6,019,563 A 2/2000 Murata et al.
2007/0256709 A1 * 11/2007 Shang .................... B41J 2/1606 134/201

FOREIGN PATENT DOCUMENTS

CN 203417266 U 2/2014
CN 104338697 A 2/2015
(Continued)

OTHER PUBLICATIONS

First Office Action cited in CN202011203503.0, mailed Sep. 23, 2022, 14 pages.
(Continued)

*Primary Examiner* — David Redding
(74) *Attorney, Agent, or Firm* — Kilpatrick Townsend & Stockton LLP

(57) ABSTRACT

The present application provides a machine cleaning device. The machine cleaning device includes: a guide rail arranged next to a carrying platform of the machine main body, a support slidably mounted on the guide rail, a cleaning component mounted on the support, a driving device connected to the support in a transmission way, and a controller connected to the driving device; and when the cleaning component cleans the top surface of the machine main body, the controller controls the driving device to drive the support to move along the guide rail, so as to drive the cleaning component to clean the top surface of the machine main body in a direction away from the carrying platform. So that unexpected particles are reduced to fall on the carrying
(Continued)

platform and contaminate the carrying platform during the cleaning process.

17 Claims, 6 Drawing Sheets

(51) Int. Cl.

| | |
|---|---|
| ***B08B 1/14*** | (2024.01) |
| ***B08B 3/02*** | (2006.01) |
| ***B08B 5/04*** | (2006.01) |
| ***B08B 13/00*** | (2006.01) |
| ***H01F 7/20*** | (2006.01) |

(52) U.S. Cl.
CPC ................ *B08B 5/04* (2013.01); *B08B 13/00* (2013.01); *H01F 7/206* (2013.01); *B08B 2203/0217* (2013.01); *B08B 2203/027* (2013.01)

(58) Field of Classification Search
CPC ...... B08B 2203/0217; B08B 2203/027; B08B 3/02; H01F 7/206; H01F 7/1638
USPC .................................................. 134/172, 198
See application file for complete search history.

(56) References Cited

FOREIGN PATENT DOCUMENTS

| | | | |
|---|---|---|---|
| CN | 204769638 | U | 11/2015 |
| CN | 105880194 | A | 8/2016 |
| CN | 205797832 | U | 12/2016 |
| CN | 106513357 | A | 3/2017 |
| CN | 109877066 | A | 6/2019 |
| EP | 2031645 | A1 | 3/2009 |

OTHER PUBLICATIONS

International Search report cited in PCT/CN2021/103379, mailed Oct. 11, 2021, 10 pages.

* cited by examiner

MACHINE CLEANING DEVICE

CROSS-REFERENCE TO RELATED APPLICATIONS

The present application is a national stage of International Patent Application No. PCT/CN2021/103379, filed on Jun. 30, 2021, which claims the priority to Chinese Patent Application No. 202011203503.0, titled "MACHINE CLEANING DEVICE", filed to China National Intellectual Property Administration on Nov. 2, 2020. The entire contents of International Patent Application No. PCT/CN2021/103379 and Chinese Patent Application No. 202011203503.0 are incorporated herein by reference.

TECHNICAL FIELD

The present application relates to the field of semiconductor devices, and in particular to a machine cleaning device.

BACKGROUND

In the semiconductor manufacturing process, various manufacturing processes are usually required. Different semiconductor manufacturing processes may be performed on different devices. For example, a deposition device is used for film formation; a polishing device is used for planarization; a photolithography device is used for patterning; and an implantation device is used for ion implantation.

To ensure the quality of semiconductor products, various devices may be placed in a clean room. A certain pressure is usually maintained in the clean room, and the air is allowed to flow from top to bottom of the clean room so as to avoid dust flying in the clean room and reduce the adverse effects of dust or other unexpected particles on semiconductor products. However, when the carrying platform, on which the parts to be processed are placed, is exposed to the machine main body, under the disturbance of the airflow, dust or unexpected particles accumulated on the top surface of the machine main body may fall onto the carrying platform and contaminate the carrying platform. As a result, the quality of the parts to be processed is affected, leading to low yield of the parts to be processed.

SUMMARY

The present application provides a machine cleaning device for cleaning the top surface of a machine main body; wherein the machine cleaning device comprises: a guide rail arranged next to a carrying platform of the machine main body, a support slidably mounted on the guide rail, a cleaning component mounted on the support, a driving device connected to the support in a transmission way, and a controller connected to the driving device; and when the cleaning component cleans the top surface of the machine main body, the controller controls the driving device to drive the support to move along the guide rail so as to drive the cleaning component to clean the top surface of the machine main body in a direction away from the carrying platform.

DETAILED DESCRIPTION

The machine cleaning device in some embodiments of the present application cleans the top surface of the machine main body with a carrying platform. The machine cleaning device includes a guide rail, a support, a driving device, a cleaning component, and a controller. The guide rail is arranged next to the carrying platform. The support is slidably mounted on the guide rail. The support is connected to the driving device in a transmission way. The driving device is controlled by the controller. The support is also provided with a cleaning component. When the cleaning component cleans the top surface of the machine main body, the controller controls the driving device to drive the support to move along the guide rail so as to drive the cleaning component to clean the top surface of the machine main body in a direction away from the carrying platform, thereby reducing the possibility of unexpected particles falling during the cleaning process. By cleaning the unexpected particles on the top surface of the machine main body close to the carrying platform, it is possible to reduce or prevent the unexpected particles from falling onto the carrying platform and contaminating the carrying platform, thereby improving the yield of the parts to be processed.

In order to make the objectives, features, and advantages of the embodiments of the present application more obvious and understandable, the technical solutions in the embodiments of the present application will be described clearly and completely with reference to the accompanying drawings in the embodiments of the present application. Apparently, the embodiments to be described are merely some embodiments of the present application, rather than all embodiments. Based on the embodiments of the present application, all other embodiments obtained by a person of ordinary skill in the art without paying any creative effort are included in the protection scope of the present application.

Figure 1:
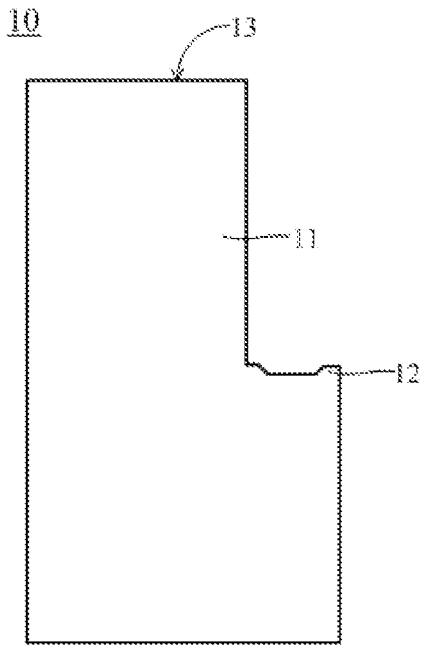
FIG. 1 is a schematic structure diagram of a machine main body in some embodiments of the present application.

Referring to FIG. 1, the equipment body 10 includes a machine main body 11, and the carrying platform 12 is usually arranged on the working side of the machine main body 11 and exposed to the machine main body 11. Exemplarily, the carrying platform 12 is arranged on the front side of the machine main body 11, and the carrying platform 12 is located outside the machine main body 11 so as to facilitate the picking and placing of the parts to be processed. The top surface of the carrying platform 12 is usually lower than the top surface 13 of the machine main body, so that the carrying platform 12 has an appropriate height and is convenient to operate the carrying platform 12.

It should be noted that a vertical cabinet may be arranged on each of two sides of the carrying platform 12, and the top surface of the vertical cabinet is flush with the top surface 13 of the machine main body. Taking the orientation shown in FIG. 2 as an example, a machine main body 11 is arranged on the right side of the carrying platform 12, and a vertical cabinet is arranged on the upper and lower sides of the carrying platform 12. The top surface 13 of the machine main body and the top surface of the vertical cabinet are on the same plane.

Figure 2:
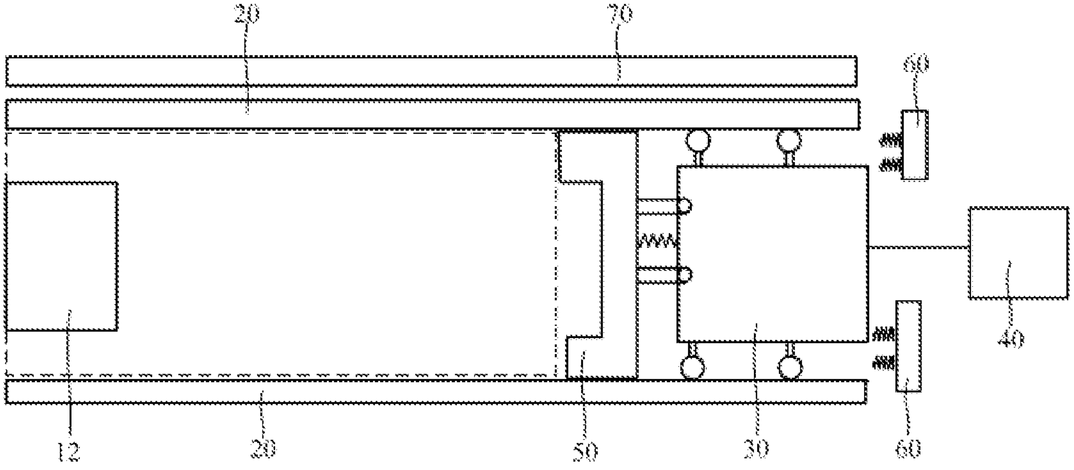
FIG. 2 is a schematic structure diagram of a machine cleaning device in some embodiments of the present application.

In some embodiments of the present application, the top surface 13 of the machine main body is cleaned by the machine cleaning device. Referring to FIG. 2, the machine cleaning device includes a guide rail 20, a support 30, a driving device 40, a cleaning component, and a controller.

The guide rail 20 is arranged next to the carrying platform 12 of the machine main body 11 to provide a track for the machine cleaning device to move. The guide rail 20 may be arranged on the side surface of the machine main body 11 or on the top surface 13 of the machine main body. The arrangement position of the guide rail 20 is not limited in the embodiments of the present application.

In some embodiments of the present application, the guide rail 20 is fixedly connected to the top surface 13 of the machine main body, and the guide rail 20 extends from the front side of the machine main body 11 to the rear side of the machine main body 11. As shown in FIG. 2, one end of the guide rail 20 corresponds to an end of the carrying platform 12. For example, the left end of the guide rail 20 is flush with the left end of the carrying platform 12, and the other end of the guide rail 20 extends away from the carrying platform 12.

There may be two guide rails 20 to improve the stability of the movement of the support 30. The two guide rails 20 are respectively arranged on both sides of the carrying platform 12, that is, the carrying platform 12 is located between the two guide rails 20. The two guide rails 20 may be arranged in parallel and opposite to each other, so that the support 30 can move on the two guide rails 20.

A support 30 is usually slidably mounted on the guide rail 20. In some possible examples, there are two guide rails 20. Wheels are respectively provided on both sides of the support 30. Guide grooves are formed on the surface of the wheels in the circumferential direction. The guide grooves are engaged with the guide rails 20 so that the support 30 can travel on the guide rails 20.

Figure 3:
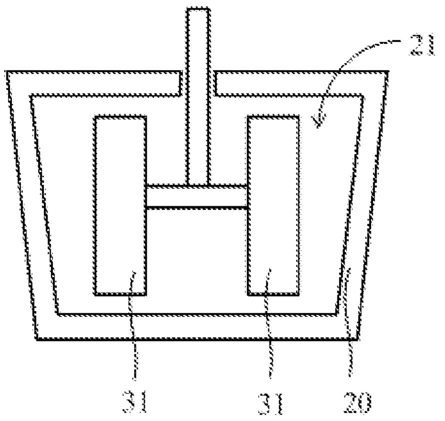
FIG. 3 is a schematic structure diagram of a guide rail and a roller in some embodiments of the present application.

In other possible examples, there are two guide rails 20. Referring to FIG. 3, each guide rail 20 is provided with a track groove 21. Rollers 31 that are adapted to the track grooves 21 are arranged on two sides of the support 30, respectively. The rollers 31 on the same side of the support 30 are arranged in the corresponding track grooves 21. The roller 31 moves relative to the track groove 21 so that the support 30 can move along the guide rail 20. With the use of the roller 31 and the track groove 21, due to the low friction between the roller 31 and the track groove 21, the number of unexpected particles carried by the support 30 during its movement can be reduced.

Exemplarily, referring to FIG. 3, taking a plane perpendicular to the extension direction of the track groove 21 as a cross-section, the cross-sectional shape of the track groove 21 may be a trapezoid, a rectangle, or other polygons. An opening on the track groove 21 for connecting the roller 31 and the support 30 may face upward as shown in FIG. 3, or may face the left or right side as shown in FIG. 3.

Along the extension direction of the guide rail 20, two rollers 31 are arranged in parallel in one track groove 21. The two rollers 31 form a set of rollers, and multiple sets of rollers form a roller module. For example, three sets of rollers form one roller module. That is, one roller module includes six rollers 31, and the six rollers 31 are arranged in three rows along the extension direction of the guide rail 20.

In order to improve the stability of the movement of the support 30, a plurality of such roller modules may be arranged on each side of the support 30. Exemplarily, two such roller modules are arranged on each side of the support 30. That is, there are twelve rollers 31 on each side of the support 30. The two roller modules on the same side of the support 30 are mounted in the same track groove 21.

Still referring to FIG. 2, the support 30 may be a flat plate, a block, or a frame. For example, the orthographic projection of the support 30 to the top surface 13 of the machine main body is a square, and the side length of the square is 20 cm. The frame may be a 田-shaped frame or a 口-shaped frame to reduce the weight of the support 30.

There may be a space between the support 30 and the top surface 13 of the machine main body, so that the cleaning component can move relative to the top surface 13 of the machine main body. When the cleaning component approaches the machine main body 11, the cleaning component is against the top surface 13 of the machine main body. Exemplarily, the cleaning component is in contact with or has a first preset distance from the top surface 13 of the machine main body. The state in which the cleaning component is in contact with or has a first preset distance from the top surface 13 of the machine main body is held. The cleaning component is driven to clean the top surface 13 of the machine main body in a direction away from the carrying platform 12.

Still referring to FIG. 2, a driving device 40 is connected to the support 30, and the driving device 40 provides power to drive the support 30 to move. The driving device 40 is in signal connection to the controller, and the controller controls the driving device 40 to work or stop. The driving device 40 may be a servo motor, an air cylinder, or a hydraulic cylinder.

Figure 4:
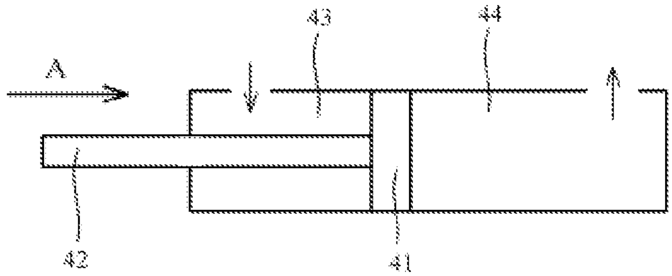
FIG. 4 is a working state diagram of an air cylinder in some embodiments of the present application.
Figure 5:
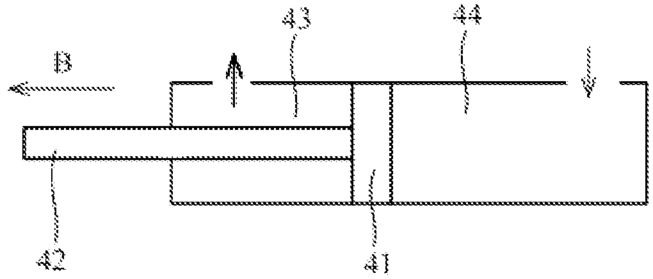
FIG. 5 is another working state diagram of the air cylinder in the embodiments of the present application.

Exemplarily, the driving device 40 is an air cylinder. Referring to FIG. 4 and FIG. 5, the air cylinder includes a piston 41 and a pushrod 42 arranged inside the air cylinder. The piston 41 divides the air cylinder into two parts. The two parts are a rod cavity 43 and a rodless cavity 44, respectively. One end of the pushrod 42 is connected to the piston 41, and the other end of the pushrod 42 is connected to the end of the support 30 away from the carrying platform 12. For example, as shown in FIG. 2, the air cylinder is arranged on the right side of the support 30.

When the rod cavity 43 of the air cylinder is in air intake and the rodless cavity 44 is in air exhaust, referring to FIG.

4, the piston 41 moves toward the rodless cavity 44, and the pushrod 42 moves in the direction A in FIG. 4, that is, the pushrod 42 retracts. The support 30 moves in a direction away from the carrying platform 12. When the rod cavity 43 of the air cylinder is in air exhaust and the rodless cavity 44 is in air intake, referring to FIG. 5, the piston 41 moves toward the rod cavity 43, and the pushrod 42 moves in B direction in FIG. 5, that is, the pushrod 42 extends. The support 30 moves toward the carrying platform 12. Whenever the rod cavity 43 or the rodless cavity 44 of the air cylinder has one air intake and exhaust operation, the piston 41 does one reciprocation, the support 30 does one reciprocation along the guide rail 20, and the machine cleaning device completes one cleaning process of the top surface 13 of the machine main body.

The driving device 40 may be in signal connection to the controller by a solenoid valve, and the controller controls the movement of the driving device 40 by controlling the solenoid valve. The controller is electrically connected to the coil of the solenoid valve to control the on and off of the coil, thereby controlling the spool position of the solenoid valve. When the driving device 40 is an air cylinder, when the spool is in the initial position, the passage between the solenoid valve and the air cylinder is disconnected, and the air cylinder does not work; when the spool is in the first position, the pushrod 42 of the air cylinder extends; when the spool is in the second position, the pushrod 42 of the air cylinder retracts.

Exemplarily, the solenoid valve is a two-position five-way valve, and the two-position five-way valve includes an air inlet, air vents, and an air outlet. Air, for example compressed air (CDA for short), is introduced from the air inlet. There are two air vents, and the two air vents are respectively connected with the rod cavity 43 and the rodless cavity 44 of the air cylinder. Air is exhausted from the air outlet.

The solenoid valve may adopt a single electric control method with a single coil and spring return, or a double electric control method with double coils. Taking, as an example, the solenoid valve being a two-position five-way valve with single electronic control, with referring to FIG. 6 to FIG. 8, the process of controlling the air cylinder by the controller will be described in detail.

Figure 6:
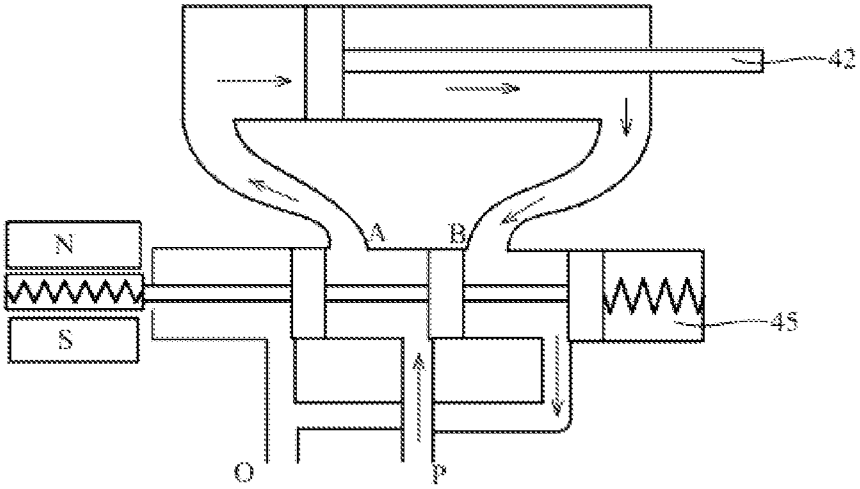
FIG. 6 is a first state of a solenoid valve and an air cylinder in some embodiments of the present application.

When there is first current in the coil, the spool is in the first position. Referring to FIG. 6, the air inlet at P point and the air vent at A point are in air intake, and the air vent at B point and the air outlet at O point are in air exhaust. The air flows in the direction indicated by the arrow in FIG. 6. The pushrod 42 of the air cylinder extends, and the support 30 moves toward the carrying platform 12.

Figure 7:
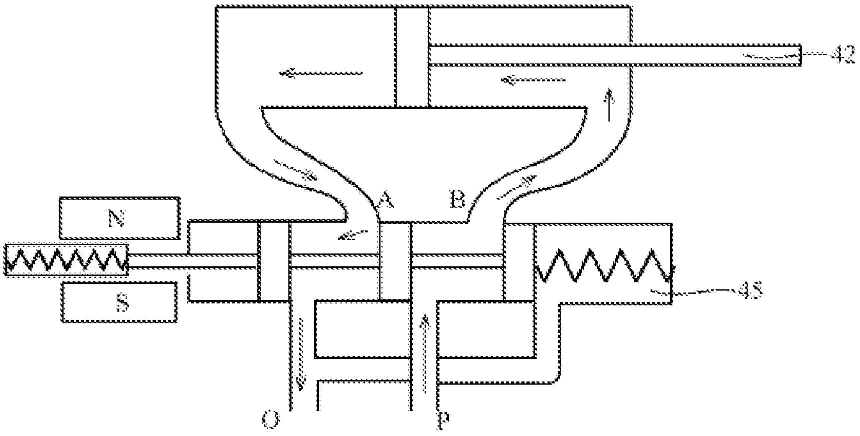
FIG. 7 is a second state of a solenoid valve and an air cylinder in some embodiments of the present application.

When the coil is de-energized, the spring pushes the spool to return to the original position, and the spool is in the second position. Referring to FIG. 7, the air inlet at P point and the air vent at B point are in air intake, the air vent at A point and the air outlet at O point are in air exhaust. The air flows in the direction indicated by the arrow in FIG. 7. The pushrod 42 of the air cylinder retracts, and the support 30 moves in a direction away from the carrying platform 12.

Figure 8:
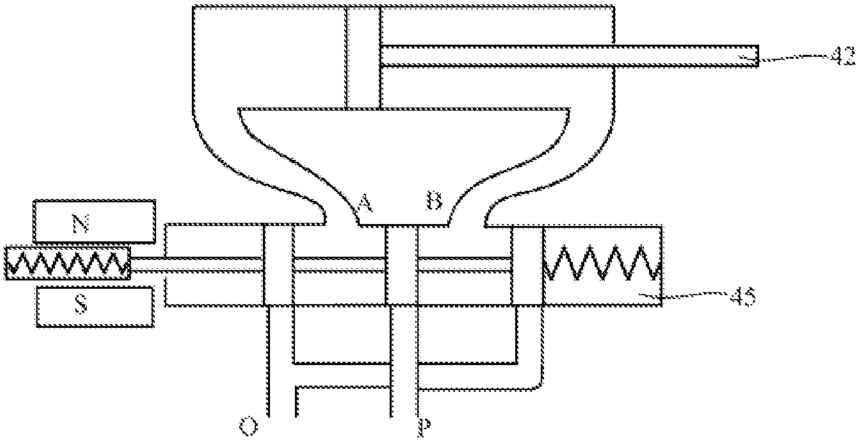
FIG. 8 is a third state of a solenoid valve and an air cylinder in some embodiments of the present application.

When there is second current in the coil, the spool is in the initial position. Referring to FIG. 8, the spool blocks the air inlet at P point, the air vent at A point, the air vent at B point, and the air outlet at O point. The air cylinder does not work, and the support 30 does not move.

still referring to FIG. 2, the cleaning component includes a lifting device and a cleaner 50. The cleaner 50 is mounted on the support 30 by the lifting device. The lifting device controls the distance between the cleaner 50 and the top surface 13 of the machine main body. That is, the lifting device can control the cleaner 50 to approach or move away from the top surface 13 of the machine main body. When the cleaner 50 approaches the top surface 13 of the machine main body, the cleaner 50 is in contact with or has a first preset distance from the top surface 13 of the machine main body; and when the cleaner 50 is far away from the top surface 13 of the machine main body, the cleaner 50 has a second preset distance from the top surface 13 of the machine main body. The second preset distance is greater than the first preset distance.

In some possible examples, the lifting device includes an electromagnet and connecting plates. Both the electromagnet and the connecting plates are fixedly connected to the support 30, and the electromagnet is in signal connection to the controller. There are two connecting plates which are respectively mounted on both sides of the electromagnet. A cleaner 50 is mounted between the connecting plates, and the cleaner 50 can slide relative to the connecting plates.

When the electromagnet is energized, the electromagnet attracts the cleaner 50, and the cleaner 50 is lifted up; and when the electromagnet is de-energized, the electromagnet does not attract the cleaner 50, and the cleaner 50 is put down. The cleaner 50 approaches the top surface 13 of the machine main body by its gravity, to come into contact with or have a first preset distance from the top surface 13 of the machine main body.

When the cleaning component cleans the top surface 13 of the machine main body, the cleaner 50 is put down, the controller controls the electromagnet to be de-energized, the cleaner 50 slides down the connecting plates relative to the support 30 by its gravity, and the cleaner 50 slides down to approach the top surface 13 of the machine main body.

Figure 9:
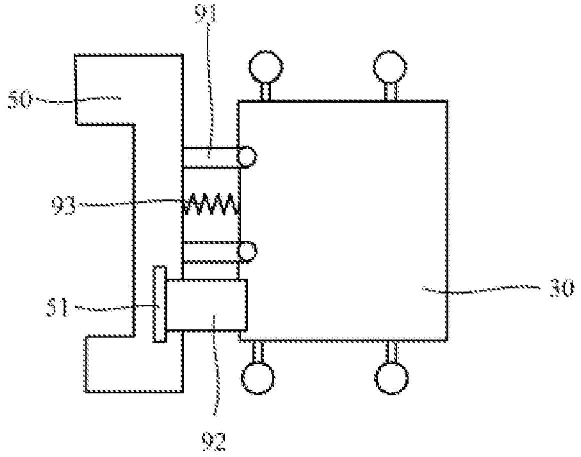
FIG. 9 is a schematic view of the connection between a support and a cleaner in some embodiments of the present application.

In other possible examples, referring to FIG. 9, the lifting device includes an electromagnet 92 and a connecting rod 91. One end of the connecting rod 91 is rotatably connected to the support 30, and the other end of the connecting rod 91 is fixedly connected to the cleaner 50. The cleaner 50 and the connecting rod 91 can rotate around the support 30. The electromagnet 92 is fixedly connected to the support 30, the electromagnet 92 is in signal connection to the controller, and the cleaner 50 is correspondingly provided with a suction plate 51.

Referring to FIG. 9, the electromagnet 92 may be horizontally fixed on the support 30 and protrude outward relative to the support 30. The end of the electromagnet 92 away from the support 30 is matched with the suction plate 51. When the electromagnet 92 is energized, the electromagnet 92 attracts the suction plate 51 and the cleaner 50 is lifted up. For example, the cleaner 50 is in the horizontal position, and the cleaner 50 has a large distance from the top of the machine main body 11. When the electromagnet 92 is de-energized, the electromagnet 92 does not attract the suction plate 51, and the cleaner 50 is put down. The cleaner 50 approaches the top surface 13 of the machine main body by its gravity.

When the cleaning component cleans the top surface 13 of the machine main body, the controller controls the electromagnet 92 to be de-energized, the cleaner 50 drives the connecting rod 91 to rotate around the support 30 by its gravity, and the cleaner 50 rotates and approaches the top surface 13 of the machine main body.

Figure 10:
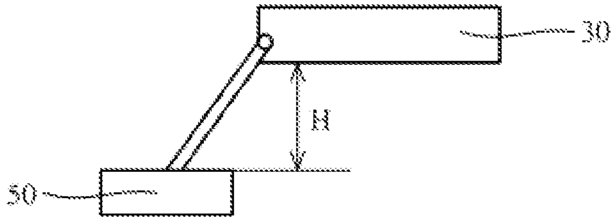
FIG. 10 is a side view of the connection between the support and the cleaner in the embodiments of the present application.

It should be noted that the cleaner 50 may descend directly below the electromagnet 92, that is, the cleaner 50 is not located directly below the support 30. As shown in FIG. 10, there is a first distance H between the cleaner 50 and the support 30. The first distance H may be 5 cm.

It should be noted that, when the cleaner 50 moves in a direction close to the carrying platform 12, in order to prevent the cleaner 50 from bringing unexpected particles to the vicinity of the carrying platform 12, the controller controls the electromagnet 92 to be energized so that the cleaner 50 is lifted up and the cleaner 50 has a second preset distance from the top surface 13 of the machine main body. The state, in which the cleaner 50 has a second preset distance from the top surface 13 of the machine main body, is maintained. The cleaner 50 moves toward the carrying platform 12.

As shown in FIG. 9, there may be two connecting rods 91. The electromagnet 92 may be arranged in the middle of the two connecting rods 91 or on the same side of the two connecting rods 91. In order to improve the stability of the cleaner 50 when it is lifted up, multiple electromagnets 92 may be provided. For example, there are two electromagnets 92. Matched suction plates 51 are arranged in corresponding areas of the cleaner 50, respectively.

The electromagnet 92 and the controller may be connected by a relay signal. The controller is electrically connected to the winding of the relay. The contacts of the relay are electrically connected to the electromagnet 92. When the contacts of the relay are closed, the electromagnet 92 is energized to attract the suction plate 51; and when the contacts of the relay are opened, the electromagnet 92 is de-energized.

Exemplarily, the contacts of the relay are normally open contacts. When the controller controls the winding of the relay to be powered on, the contacts of the relay are closed and the electromagnet 92 is energized; and when the controller controls the winding of the relay to be powered off, the contacts of the relay are opened and the electromagnet 92 is de-energized. The contacts of the relay may be normally closed contacts. When the controller controls the winding of the relay to be powered off, the contacts of the relay are closed and the electromagnet 92 is energized; and when the controller controls the winding of the relay to be powered on, the contacts of the relay are opened and the electromagnet 92 is de-energized.

In order to buffer the descending speed of the cleaner 50, referring to FIG. 9, a first spring 93 is provided between the cleaner 50 and the support 30. One end of the first spring 93 is fixedly connected to the cleaner 50, and the other end of the first spring 93 is fixedly connected to the support 30. When the electromagnet 92 is de-energized and the cleaner 50 descends, the first spring 93 stretches, and the cleaner 50 slowly descends by its gravity and by the pulling force of the first spring 93, so that the operation of the machine cleaning device is more stable.

The cleaner 50 may have a concave structure, and the direction of an opening of the concave structure is opposite to the movement direction of the cleaning component when the cleaning component cleans the top surface 13 of the machine main body. As shown in FIG. 2, when the cleaning component cleans the top surface 13 of the machine main body, the movement direction of the cleaning component is from left to right, and the opening of the concave structure faces left.

The opening of the concave structure penetrates through two opposite sides of the cleaner 50. As shown in FIG. 2, the opening of the concave structure penetrates through the opposite upper and lower sides of the cleaner 50. When the cleaning component cleans the top surface 13 of the machine main body, the lifting device drives the cleaner 50 to descend toward the carrying platform 12, and the carrying platform 12 is exposed in the opening of the concave structure. The top surfaces of the two vertical cabinets on both sides of the carrying platform 12 are covered by the concave structure. That is, when the cleaner 50 approaches and holds at the top surface 13 of the machine main body, the concave structure of the cleaner 50 is adapted to the carrying platform 12 and the vertical cabinet, so that the cleaner 50 can clean the top surface of the vertical cabinet.

Exemplarily, the carrying platform 12 is completely exposed in the opening of the concave structure, and coincides with the orthographic projection of the carrying platform 12 and the opening of the concave structure to the top surface 13 of the machine main body. The top surfaces of the two vertical cabinets are completely covered by the concave structure. This arrangement prevents the cleaner 50 from being located directly above the carrying platform 12 while cleaning the top surface of the vertical cabinet, thereby preventing unexpected particles on the cleaner 50 from falling onto the carrying platform 12 and reducing the possibility of contaminating the carrying platform 12.

Figure 11:
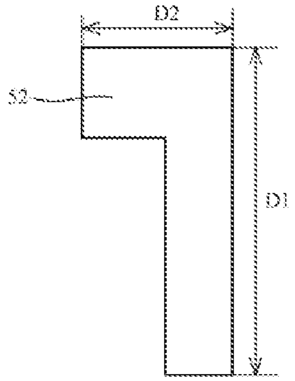
FIG. 11 is a schematic structure diagram of a cleaning block in some embodiments of the present application.

The concave structure may include two L-shaped cleaning blocks 52. Referring to FIG. 11, two L-shaped cleaning blocks 52 are joined together to form the concave structure. The long side D1 of the L-shaped cleaning block 52 is 30 cm in length, and the short side D2 is 5 cm in length. The two L-shaped cleaning blocks 52 may be respectively connected to a lifting device. That is, each L-shaped cleaning block 52 is driven by one lifting device, respectively. The two L-shaped cleaning blocks 52 may be connected as a whole and then connected to a lifting device.

The cleaner 50 is used for cleaning the top surface 13 of the machine main body. The cleaner 50 may or may not be in contact with the top surface 13 of the machine main body.

When the cleaner 50 comprises a cleaning brush or a cleaning cloth to clean the top surface 13 of the machine main body, the cleaner 50 approaches the top surface 13 of the machine main body and is in contact with the top surface 13 of the machine main body. The cleaner 50 maintains this state and moves in a direction away from the carrying platform 12 under the drive of the support 30. That is, the cleaner 50 moves from the front side of the machine main body 11 to the rear side of the machine main body 11 for cleaning unexpected particles to the side away from the carrying platform 12. In this way, the top surface 13 of the machine main body close to the carrying platform 12 is cleaned.

When the cleaner 50 is a dust-removal sucker to clean the top surface 13 of the machine main body, the cleaner 50 approaches the top surface 13 of the machine main body and has a first preset distance from the top surface 13 of the machine main body. That is, the cleaner 50 is not in contact with the top surface 13 of the machine main body. The cleaner 50 maintains a first preset distance and moves in a direction away from the carrying platform 12 under the drive of the support 30, so that unexpected particles can be sucked from the top surface 13 of the machine main body. In this way, the top surface 13 of the machine main body close to the carrying platform 12 is cleaned. The dust-removal sucker may be a vacuum sucker.

Still referring to FIG. 2, the machine cleaning device is provided with a limiting device 60 to prevent the support 30 from moving beyond the range. The limiting device 60 is arranged next to an end of the guide rail 20 away from the carrying platform 12 and opposite to the guide rail 20. That is, the limiting device 60 is arranged on the rear side of the machine main body 11. The limiting device 60 resists against the support 30 when the support 30 moves to an end of the guide rail 20 away from the carrying platform 12.

Figure 12:
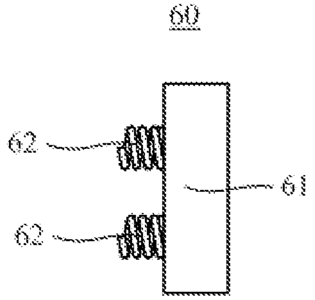
FIG. 12 is a schematic structure diagram of a limiting device in some embodiments of the present application.

The limiting device 60 includes two limiting blocks 61. Referring to FIG. 12, the two limiting blocks 61 correspond to the two guide rails 20 one to one, and two second springs 62 are arranged on a side of each limiting block 61 facing the support 30. The expansion and contraction direction of the second spring 62 is the same as the movement direction of the support 30, for the purpose of damping and buffering the support 30. The limiting block 61 may be a limiting iron block, and the second spring 62 may be a rubber air spring.

Still referring to FIG. 2, the machine cleaning device is further provided with a positioning device 70. The positioning device 70 is in information connection to the controller, and outputs, to the controller, the position information of the support 30 relative to the front side of the machine main body 11 to determine the position of the support 30 relative to the carrying platform 12. The controller controls the driving device 40 and the lifting device according to the received position information to control the cleaning process of the machine cleaning device.

The positioning device 70 may be a grating scale, including a scale grating 71 and a grating reader. The scale grating 71 is parallel to the guide rail 20. The scale grating 71 may be arranged on the top surface 13 of the machine main body, and the grating reader is arranged on the support 30. There is no direct contact between the scale grating 71 and the grating reader during operation.

Figure 13:
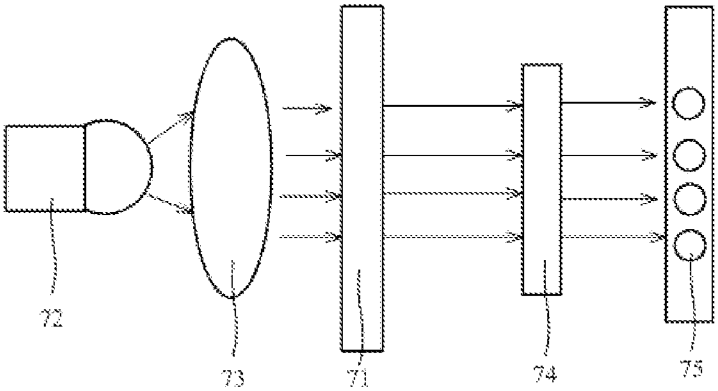
FIG. 13 is a schematic view of a grating scale in some embodiments of the present application.
Figure 14:
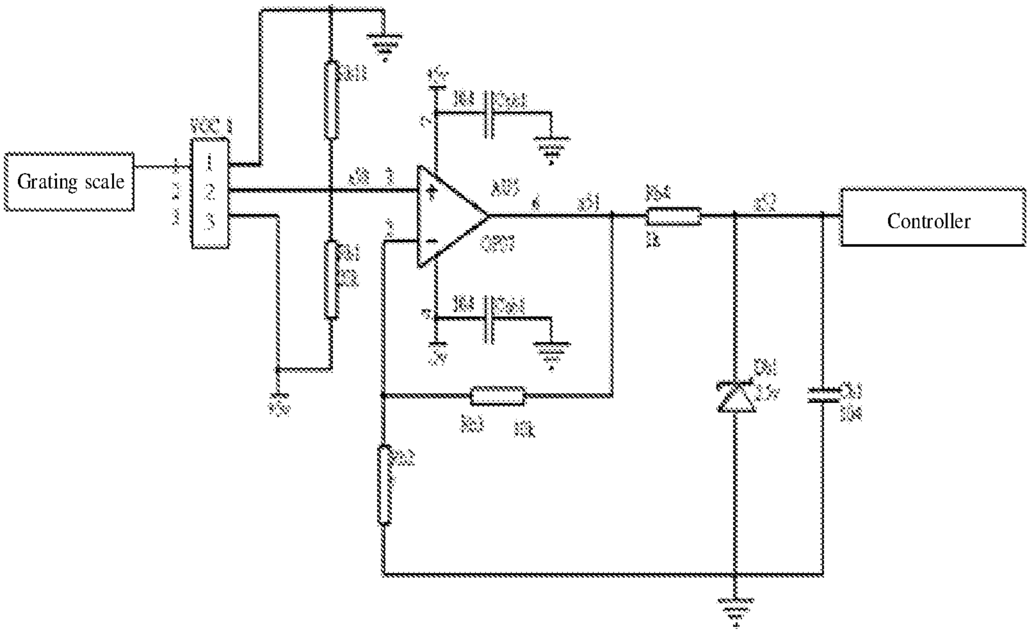
FIG. 14 is a circuit diagram of a signal processing circuit in some embodiments of the present application.

The grating reader includes a light source 72, a lens 73, an indicating grating 74, and a photoelectric element 75. Referring to FIG. 13, the light source 72 may be an LED light source 72; the indicating grating 74 and the scale grating 71 have the same pitch; the photoelectric element 75 may be a photosensitive element, for example a photodiode or a phototriode; and the photoelectric element 75 is connected to the controller by a signal processing circuit so that the grating reader can detect and send the position information of the support 30. The signal processing circuit may be an A/D conversion circuit (analog/digital converter), including resistors, capacitors, diodes, etc. These elements are connected in the manner shown in FIG. 14 to form a signal processing circuit.

When the indicating grating 74 moves relative to the scale grating 71, light converged by the lens 73 passes through the slits of the scale grating 71 and the indicating grating 74 to form bright and dark moire fringes. The photoelectric element 75 converts the light intensity change signals of the moire fringes into electrical signals which are then filtered by the signal processing circuit. The output signals are close to sine waves. The controller subdivides and counts the sine waves to obtain the displacement of the indicating grating 74.

Exemplarily, the displacement detected by the grating scale is 190 cm. The closer to the carrying platform 12, the less the displacement detected by the grating scale. When the displacement is 0 cm, the cleaner 50 is in contact with or has a first preset distance from the top surface 13 of the machine main body, and moves in a direction away from the carrying platform 12; and when the displacement is 190 cm, the cleaner 50 stops moving, the limiting device 60 buffers and limits the support 30 to prevent the cleaning component from moving beyond the cleaning range.

Figure 15:
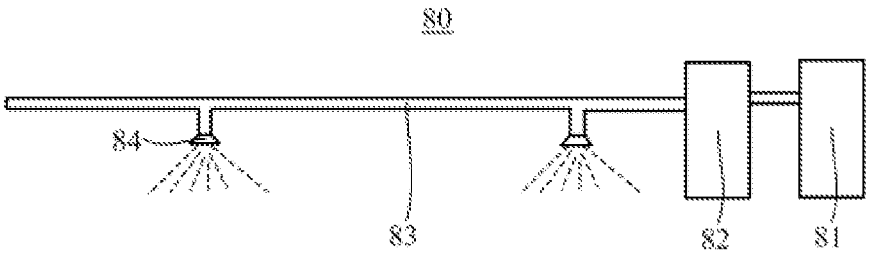
FIG. 15 is a schematic structure diagram of an atomization device in some embodiments of the present application.

In order to improve the cleaning effect, the machine cleaning device further includes an atomization device 80. The atomization device 80 sprays the atomized detergent in the to-be-cleaned areas on the top surface 13 of the machine main body, for example the dashed areas shown in FIG. 2, so that the top surface 13 of the machine main body in the to-be-cleaned areas is wetted. This facilitates the cleaning of unexpected particles. Referring to FIG. 15, the atomization device 80 includes a detergent storage device 81, a pumping device 82, a pipe 83, and a sprayer 84 arranged on the pipe 83 and connected with the pipe 83.

The detergent storage device 81 may be a storage tank for storing detergent. The detergent wets the top surface 13 of the machine main body. This can adsorb unexpected particles floating on the top surface 13 of the machine main body so that they fall onto the top surface 13 of the machine main body. After the volatilization of the detergent, the cleaning component cleans the top surface 13 of the machine main body. When the cleaner is cleaning cloth, it may clean the top surface 13 of the machine main body when the top surface 13 of the machine main body is wetted, so that unexpected particles can be easily cleaned from the top surface 13 of the machine main body.

The detergent may be water or alcohol. In some embodiments of the present application, the detergent is alcohol. On one hand, alcohol has better effect in cleaning unexpected particles. On the other hand, alcohol is highly volatile and thus less likely to corrode the machine main body 11 and the carrying platform 12, with low residue. The detergent storage device 81 is an alcohol storage tank with a capacity of 2 L. The remaining amount of detergent in the detergent storage device 81 is checked regularly, for example, once every two months, and the detergent storage device is replaced in time when the detergent is insufficient.

The pumping device 82 is connected with the detergent storage device 81 and the pipe 83 for pumping the detergent in the detergent storage device 81 into the pipe 83. The pumping device 82 may be a flow pump. The pumping device 82 is in signal connection to the controller, and the controller controls the working state of the pumping device 82.

When the pumping device 82 receives the atomization signal from the controller, the pumping device 82 pumps the detergent in the detergent storage device 81 into the pipe 83. The sprayer 84 sprays the atomized detergent onto the to-be-cleaned areas on the machine main body 11. The working time of the pumping device 82 may be 10 seconds, and the spraying dose of the detergent is greater than or equal to 20 ml.

The sprayer 84 is arranged opposite to the top surface 13 of the machine main body, that is, the sprayer 84 faces the top surface 13 of the machine main body. A plurality of sprayers 84 may be provided, so that the part of the top surface 13 of the machine main body located in the to-be-cleaned areas can be completely wetted. Exemplarily, the sprayer 84 is an ultrasonic atomization sprayer.

The controller in some embodiments of the present application may be a central processing unit (CPU). The controller is in signal connection to the driving device 40, the lifting device, the positioning device 70, and the pumping device 82 to control the cleaning process of the machine cleaning device.

When the machine cleaning device is not working, the cleaning component is in the initial state, and the cleaning component is located on the back side of the machine main body 11. As shown in FIG. 2, the cleaning component is located on the right side, and the displacement measured by the grating scale is the maximum displacement. For example, the displacement is 190 cm.

The cleaning process of the machine cleaning device specifically includes: the atomization device 80 wets the top surface 13 of the machine main body, the cleaning component moves from the initial position to the cleaning-begin position, and the cleaning component cleans the top surface 13 of the machine main body.

Specifically, the top surface 13 of the machine main body is first wetted by the atomization device 80, and the controller controls the operation of the atomization device 80 to wet the to-be-cleaned areas on the top surface 13 of the machine main body, for example, the atomization device 80 works for 10 s.

After wetting, the cleaning component moves from the initial position to the cleaning-begin position. The controller controls the lifting device to lift the cleaner 50 up. The cleaner 50 has a second preset distance from and holds at the top surface 13 of the machine main body. The controller controls the driving device 40 to drive the support 30 to move toward the carrying platform 12. It may be understood that, when the displacement measured by the grating scale is the maximum displacement, the cleaning component is in the initial position; and when the displacement measured by the grating scale is zero, the cleaning component is in the cleaning-begin position.

The cleaning process of the top surface 13 of the machine main body by the cleaning component includes: the cleaner 50 approaches and holds at the top surface 13 of the machine main body, and the cleaner 50 moves along the guide rail 20 to the initial position.

When the cleaning component is in the cleaning-begin position, the controller controls the lifting device to drive the cleaner 50 to descend toward the top surface 13 of the machine main body, the cleaner 50 approaches the top surface 13 of the machine main body, the cleaner 50 is in contact with or has a first preset distance from the top surface of the machine main body 13, and the height of the cleaner 50 is maintained.

The height of the cleaner 50 is maintained. The controller controls the driving device 40. The driving device 40 drives the support 30 to move along the guide rail 20 to drive the cleaner 50 to move in a direction away from the carrying platform 12 and stop until the support 30 returns to the initial position. The cleaner 50 moves from the cleaning-begin position to the initial position along the guide rail 20. The cleaning component moves back and forth from the initial position to the cleaning-begin position once to complete one cleaning process of the top surface 13 of the machine main body.

In some embodiments of the present application, the cleaning of the top surface 13 of the machine main body by the machine cleaning device can be completed in a variety of ways.

In some possible examples, the controller of the machine cleaning device is provided with a timing device, for example a timer. When the predetermined time is reached, the machine cleaning device cleans the top surface 13 of the machine main body. For example, the machine cleaning device completes one cleaning process once a day. By the timing device, the top surface 13 of the machine main body may be cleaned regularly and automatically. On one hand, this can reduce the number of manual cleaning processes and ensure the operation safety of personnel. On the other hand, this can reduce the accumulation of unexpected particles and reduce the possibility of falling of unexpected particles due to disturbance generated when the cleaning component moves.

In other possible examples, the controller of the machine cleaning device is connected to an automation system. The top surface 13 of the machine main body is cleaned according to the quality of the parts to be processed. For example, when the automation system has a reticle reject, the automation system issues a cleaning instruction to the machine cleaning device, and the machine cleaning device cleans the top surface 13 of the machine main body. For example, the machine cleaning device completes two cleaning processes.

Figure 16:
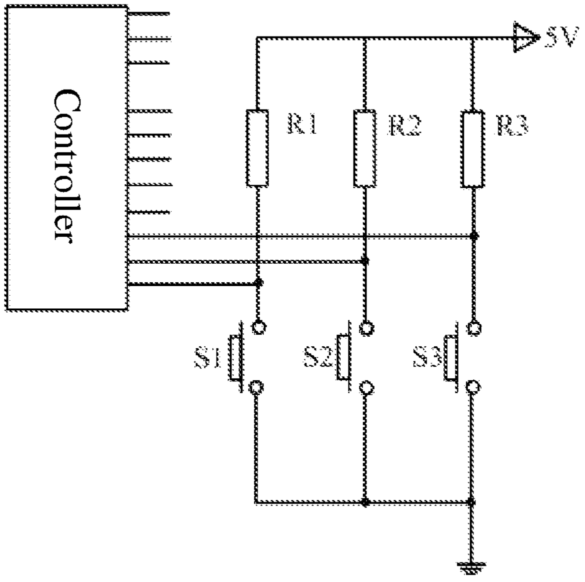
FIG. 16 is a schematic view of a keyboard circuit in some embodiments of the present application.

In still other possible examples, the controller of the machine cleaning device is connected to a keyboard circuit. As shown in FIG. 16, the keyboard circuit includes three branches, each of which is connected in series with keys and resistors. S1, S2, and S3 shown in FIG. 16 are the keys in the keyboard circuit. R1, R2 and R3 shown in FIG. 16 are all resistors. The resistance of the resistors is $4.7\times10^3$ ohms. One end of each branch is grounded, and one end thereof is connected to a positive voltage, for example, a voltage of 5V. Three pins of the controller are respectively connected to the keys and resistors in each branch.

When a key is disconnected, the voltage at the pin of the controller corresponding to the key is 5V. When a key is pressed down, the voltage at the pin of the controller corresponding to the key is zero. The controller can determine whether a key is pressed down according to the change in voltage at the pin. When a key is pressed down, the machine cleaning device completes one cleaning process.

The machine cleaning device in some embodiments of the present application cleans the top surface 13 of the machine main body with the carrying platform 12. The machine cleaning device includes a guide rail 20, a support 30, a driving device 40, a cleaning component and a controller. The guide rail 20 is arranged next to the carrying platform 12. A support 30 that can slide along the guide rail 20 is mounted on the guide rail 20. The support 30 is connected to the driving device 40 in a transmission way. The driving device 40 is in signal connection to the controller. The driving device 40 drives the support 30 to move along the guide rail 20. A cleaning component is mounted on the support 30. When the cleaning component cleans the top surface 13 of the machine main body, the controller controls the driving device 40 to drive the cleaning component to clean the top surface 13 of the machine main body in a direction away from the carrying platform 12, thereby reducing the possibility of falling of unexpected particles when the cleaning component cleans the top surface 13 of the machine main body and preventing the carrying platform 12 from being contaminated during the cleaning process. In addition, by cleaning the unexpected particles from the top surface 13 of the machine main body close to the carrying platform 12, the unexpected particles accumulated on the top surface 13 of the machine main body are reduced or prevented from falling onto the carrying platform 12, thereby reducing the contamination of the carrying platform 12 by unexpected particles and improving the cleanliness of the carrying platform 12 and thus the yield of the parts to be processed.

The various embodiments or implementations in this specification have been described in a progressive manner. Each embodiment focuses on the differences from other embodiments. The same or similar parts between the various embodiments may be referred to each other.

It should be understood that, in the disclosure of the present invention, orientations or positional relationships indicated by terms “longitudinal”, “transverse”, “upper”, “lower”, “front”, “rear”, “left”, “right”, “vertical”, “horizontal”, “top”, “bottom”, “inner”, “outer” and the like are the orientations and the positional relationships illustrated on the basis of the accompanying drawings, merely used for ease of describing the present application and simplifying the description, rather than indicating or implying that the stated systems or elements must have a specific orientation or must be constructed and operated in a specific orientation. Thus, those terms shall not be interpreted as any limitation to the present application.

In the description of this specification, the description of terms such as "one implementation", "some implementations", "exemplary implementations", "an example", "a specific example", or "some examples" are intended to indicate that specific features, structures, materials, or characteristics described with reference to the implementation or example are included in at least one implementation or example of the present application. In this specification, the exemplary descriptions of the above terms do not necessarily mean a same implementation or example. Moreover, the specific features, structures, materials, or characteristics that have been described may be combined in a proper manner in any one or more implementations or examples.

Finally, it should be noted that the embodiments are only used to illustrate, rather than limiting, the technical solutions of the present application. Although the present application has been described in detail with reference to the foregoing embodiments, it should be understood by a person of ordinary skill in the art that the technical solutions described in the foregoing embodiments can still be modified, or some or all of the technical features can be equivalently replaced; and these modifications or replacements do not make the essence of the corresponding technical solutions deviate from the scope of the technical solutions of the embodiments of the present application.

The invention claimed is:

1. A machine cleaning device, for cleaning a top surface of a machine main body, wherein the machine cleaning device comprises:

a guide rail arranged next to a carrying platform of the machine main body, a support slidably mounted on the guide rail, a cleaning component mounted on the support, a driving device connected to the support in a transmission way, a controller connected to the driving device, a lifting device in signal connection to the controller, and a cleaner mounted on the support by the lifting device; and when the cleaning component cleans the top surface of the machine main body, the controller controls the lifting device to make the cleaner approach the top surface of the machine main body, and the controller controls the driving device to drive the support to move along the guide rail, so as to drive the cleaning component to clean the top surface of the machine main body in a direction away from the carrying platform.

2. The machine cleaning device according to claim 1, wherein, the lifting device comprises an electromagnet mounted on the support and two connecting plates mounted on the support, the two connecting plates are respectively located on both sides of the electromagnet; and the cleaner is slidably mounted between the two connecting plates, and the electromagnet is in signal connection to the controller; and when the cleaning component cleans the top surface of the machine main body, the controller controls the electromagnet to be de-energized, and the cleaner approaches and holds at the top surface of the machine main body.

3. The machine cleaning device according to claim 1, wherein, the lifting device comprises an electromagnet mounted on the support and a connecting rod rotatably connected to the support at one end, and a second end of the connecting rod is fixedly connected to the cleaner; and the electromagnet is in signal connection to the controller; and when the cleaning component cleans the top surface of the machine main body, the controller controls the electromagnet to be de-energized, and the cleaner approaches and holds at the top surface of the machine main body.

4. The machine cleaning device according to claim 2, wherein, the controller is electrically connected to a winding of a relay, and contacts of the relay are electrically connected to the electromagnet; and when the cleaning component cleans the top surface of the machine main body, the contacts of the relay are disconnected, and the electromagnet is de-energized.

5. The machine cleaning device according to claim 2, wherein, the lifting device further comprises a first spring, one end of the first spring is fixedly connected to the cleaner, and a second end of the first spring is fixedly connected to the support; and when the controller controls the electromagnet to be de-energized, the first spring buffers a descending speed of the cleaner.

6. The machine cleaning device according to claim 1, wherein, a vertical cabinet is provided on each of two sides of the carrying platform, and a top surface of the vertical cabinet is flush with the top surface of the machine main body;

the cleaner has a concave structure, and a direction of an opening of the concave structure is opposite to a movement direction of the cleaning component when the cleaning component cleans the top surface of the machine main body; and when the lifting device drives the cleaner to descend toward the carrying platform, the carrying platform is exposed in the opening of the concave structure, and top surfaces of the two vertical cabinets are covered by the concave structure.

7. The machine cleaning device according to claim 6, wherein, the concave structure comprises two L-shaped cleaning blocks, and the two L-shaped cleaning blocks are joined together to form the concave structure.

8. The machine cleaning device according to claim 1, wherein, the cleaner comprises a cleaning brush or a cleaning cloth; and when the cleaning component cleans the top surface of the machine main body, the cleaner comes into contact with and holds at the top surface of the machine main body, and moves in the direction away from the carrying platform.

9. The machine cleaning device according to claim 1, wherein, the cleaner comprises a dust-removal sucker; and when the cleaning component cleans the top surface of the machine main body, the cleaner has a first preset distance from and holds at the top surface of the machine main body, and moves in the direction away from the carrying platform.

10. The machine cleaning device according to claim 1, wherein, there are two guide rails, the two guide rails are parallel to each other and arranged oppositely on the top surface of the machine main body, the two guide rails are located on both sides of the carrying platform, and each of the two guide rails is provided with a track groove; and rollers are arranged on both sides of the support, and the rollers on one side of the support are arranged in corresponding track grooves.

11. The machine cleaning device according to claim 1, wherein, the machine cleaning device further comprises a limiting device arranged at an end of the guide rail away from the carrying platform, and the limiting device is configured to resist against the support when the support moves to the end of the guide rail away from the carrying platform.

12. The machine cleaning device according to claim 11, wherein, there are two guide rails, the limiting device comprises two limiting blocks that correspond to the two guide rails one to one, two second springs are arranged on a side of each of the two limiting blocks facing the support, and expansion and contraction direction of each of the two second springs is the same as a movement direction of the support.

13. The machine cleaning device according to claim 1, wherein, the machine cleaning device further comprises a positioning device that is in signal connection to the controller, and the positioning device outputs position information of the support; and the controller controls the driving device and the cleaning component according to the received position information.

14. The machine cleaning device according to claim 13, wherein, the positioning device comprises a scale grating arranged next to the support and parallel to the guide rail, and a grating reader arranged on the support; and the grating reader is connected to the controller and is used to detect and send the position information of the support.

15. The machine cleaning device according to claim 1, wherein, the machine cleaning device further comprises an atomization device for wetting the top surface of the machine main body;

the atomization device comprises a detergent storage device, a pumping device connected with the detergent storage device, a pipe connected with the pumping device, and a sprayer arranged on the pipe and connected with the pipe; and the pumping device is in signal connection to the controller; and when the cleaning component cleans the top surface of the machine main body, the controller controls the pumping device to pump detergent in the detergent storage device into the pipe and spray the detergent onto the top surface of the machine main body after the detergent is atomized by the sprayer.

16. A machine cleaning device, for cleaning a top surface of a machine main body, wherein the machine cleaning device comprises:

a guide rail arranged next to a carrying platform of the machine main body, a support slidably mounted on the guide rail, a cleaning component mounted on the support, a driving device connected to the support in a transmission way, a controller connected to the driving device, and a limiting device arranged at an end of the guide rail away from the carrying platform and configured to resist against the support when the support moves to the end of the guide rail away from the carrying platform; and when the cleaning component cleans the top surface of the machine main body, the controller controls the driving device to drive the support to move along the guide rail, so as to drive the cleaning component to clean the top surface of the machine main body in a direction away from the carrying platform.

17. A machine cleaning device, for cleaning a top surface of a machine main body, wherein the machine cleaning device comprises:

a guide rail arranged next to a carrying platform of the machine main body, a support slidably mounted on the guide rail, a cleaning component mounted on the support, a driving device connected to the support in a transmission way, a controller connected to the driving device, a positioning device that is in signal connection to the controller and outputs position information of the support, wherein the controller controls the driving device and the cleaning component according to the received position information; the positioning device comprises a scale grating arranged next to the support and parallel to the guide rail, and a grating reader arranged on the support; and the grating reader is connected to the controller and is used to detect and send the position information of the support; and when the cleaning component cleans the top surface of the machine main body, the controller controls the driving device to drive the support to move along the guide rail, so as to drive the cleaning component to clean the top surface of the machine main body in a direction away from the carrying platform.

* * * * *